(12) United States Patent
Wright

(10) Patent No.: US 9,288,976 B1
(45) Date of Patent: Mar. 22, 2016

(54) GAME CALLING DEVICE

(71) Applicant: Steven J. Wright, Dundee, NY (US)

(72) Inventor: Steven J. Wright, Dundee, NY (US)

( * ) Notice: Subject to any disclaimer, the term of this patent is extended or adjusted under 35 U.S.C. 154(b) by 93 days.

(21) Appl. No.: 13/973,500

(22) Filed: Aug. 22, 2013

(51) Int. Cl.
*A63H 33/40* (2006.01)
*A01M 31/00* (2006.01)

(52) U.S. Cl.
CPC .................................. *A01M 31/004* (2013.01)

(58) Field of Classification Search
CPC .................................................... A01M 31/004
USPC ......... 446/227, 297, 397, 418, 419, 420, 421, 446/422
See application file for complete search history.

(56) References Cited

U.S. PATENT DOCUMENTS

| | | | | |
|---|---|---|---|---|
| 4,531,924 A * | 7/1985 | Samson | ......................... | 446/213 |
| 4,968,283 A * | 11/1990 | Montgomery | ................ | 446/419 |
| 5,228,270 A * | 7/1993 | Aarts | ............... | 53/432 |
| 5,794,568 A * | 8/1998 | Udelle et al. | .................. | 119/707 |
| 6,234,865 B1 * | 5/2001 | Battey | ............ | 446/419 |
| 6,240,671 B1 * | 6/2001 | Galfidi, Jr. | ......................... | 42/90 |
| 6,599,167 B2 * | 7/2003 | Waltz | ............. | 446/397 |
| 6,780,079 B2 * | 8/2004 | Musacchia, Jr. | ............... | 446/397 |
| 7,470,845 B2 * | 12/2008 | Fermie et al. | .................... | 84/402 |
| 2005/0086910 A1* | 4/2005 | Chambers et al. | ............... | 53/399 |
| 2007/0232187 A1* | 10/2007 | Halstead | ....................... | 446/418 |
| 2009/0162496 A1* | 6/2009 | Henderson et al. | ............. | 426/87 |
| 2011/0192353 A1* | 8/2011 | Willinger et al. | ............. | 119/709 |

\* cited by examiner

*Primary Examiner* — Vishu Mendiratta

(57) ABSTRACT

A housing forms an enclosed chamber. A container essentially fills the chamber is fabricated of a crinkle paper or like material adapted to produce a crackling and rustling sound when touched and manipulated by a user. A plurality of objects within the container are fabricated of a rigid material adapted to provide a three dimensional shape to the container and the housing for facilitating the movement of the crinkle paper or like material when manipulated by the user for creating a sound which will attract game during use.

1 Claim, 2 Drawing Sheets

GAME CALLING DEVICE

BACKGROUND OF THE INVENTION

1. Field of the Invention

The present invention relates to a game calling device and more particularly pertains to creating a sound at the discretion of a user, the sound being of the type to attract game, the creating of the sound and the attracting of the game being done in a safe, convenient and economical manner.

2. Description of the Prior Art

The use of game calling devices of known designs and configurations is known in the prior art. More specifically, game calling devices of known designs and configurations previously devised and utilized for the purpose of creating a sound to attract game are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a game calling device that allows creating a sound at the discretion of a user, the sound being of the type to attract game, the creating of the sound and the attracting of the game being done in a safe, convenient and economical manner.

In this respect, the game calling device according to the present invention substantially departs from the conventional concepts and designs of the prior art, and in doing so provides an apparatus primarily developed for the purpose of creating a sound at the discretion of a user, the sound being of the type to attract game, the creating of the sound and the attracting of the game being done in a safe, convenient and economical manner.

Therefore, it can be appreciated that there exists a continuing need for a new and improved game calling device which can be used for creating a sound at the discretion of a user, the sound being of the type to attract game, the creating of the sound and the attracting of the game being done in a safe, convenient and economical manner. In this regard, the present invention substantially fulfills this need.

SUMMARY OF THE INVENTION

In view of the foregoing disadvantages inherent in the known types of game calling devices of known designs and configurations now present in the prior art, the present invention provides an improved game calling device. As such, the general purpose of the present invention, which will be described subsequently in greater detail, is to provide a new and improved game calling device and method which has all the advantages of the prior art and none of the disadvantages.

To attain this, the present invention essentially comprises a housing forming an enclosed chamber. A container essentially fills the chamber is fabricated of a crinkle material adapted to produce a crackling sound when touched and manipulated by a user. A plurality of objects within the container are fabricated of a rigid material adapted to provide a three dimensional shape to the container and the housing for facilitating the movement of the crinkle material when manipulated by the user for creating sound and attracting game during use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved game calling device which has all of the advantages of the prior art game calling devices of known designs and configurations and none of the disadvantages.

It is another object of the present invention to provide a new and improved game calling device which may be easily and efficiently manufactured and marketed.

It is a further object of the present invention to provide a new and improved game calling device which is of durable and reliable constructions.

An even further object of the present invention is to provide a new and improved game calling device which is susceptible of a low cost of manufacture with regard to both materials and labor, and which accordingly is then susceptible of low prices of sale to the consuming public, thereby making such game calling device economically available to the buying public.

Lastly, it is an object of the present invention to provide a new and improved game calling device for creating a sound at the discretion of a user, the sound being of the type to attract game, the creating of the sound and the attracting of the game being done in a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
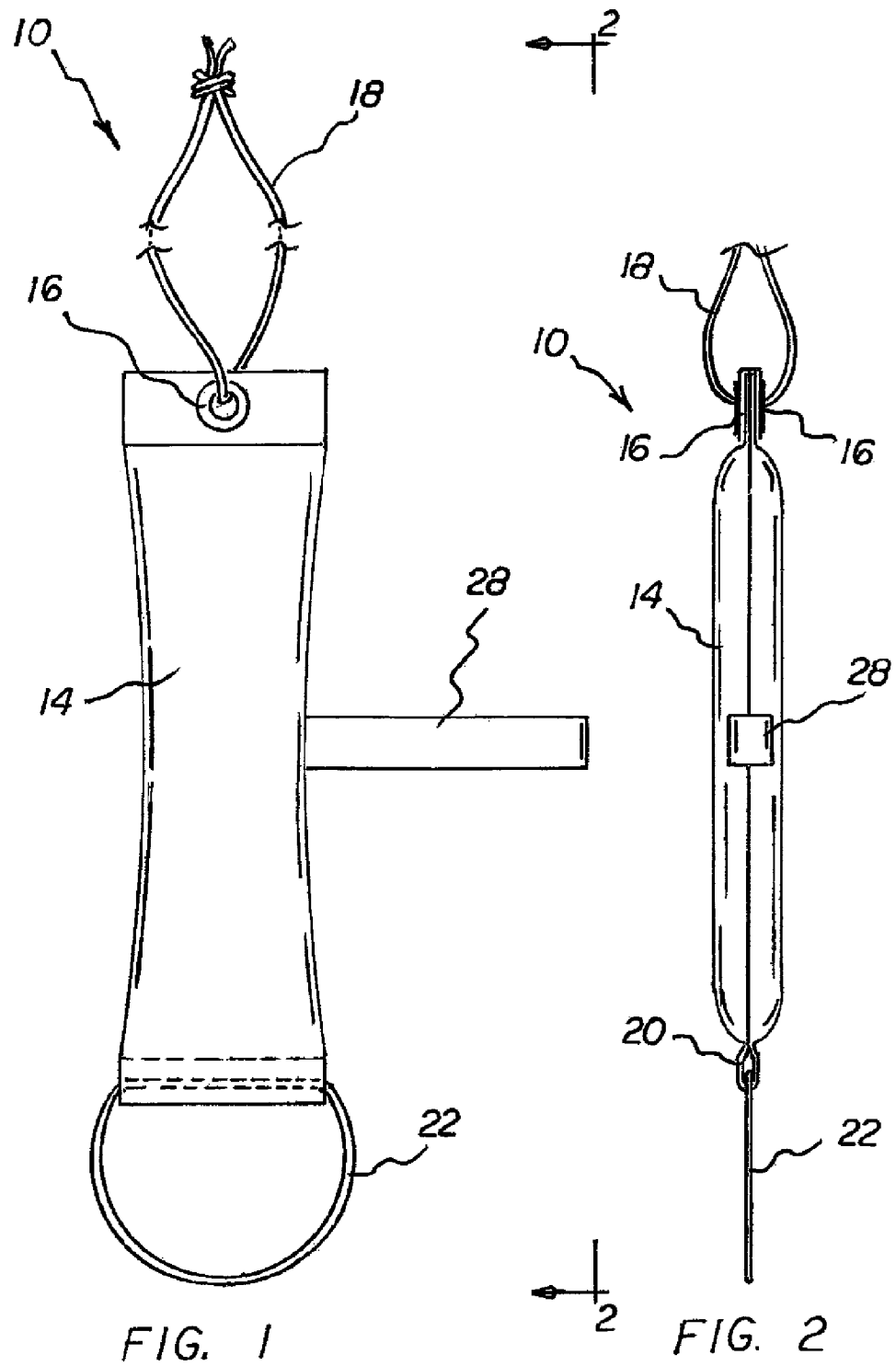
FIG. 1 is a front elevational view of a game calling device constructed in accordance with the principles of the present invention.
FIG. 2 is a side elevational view taken along line 2-2 of FIG. 1.
Figure 3:
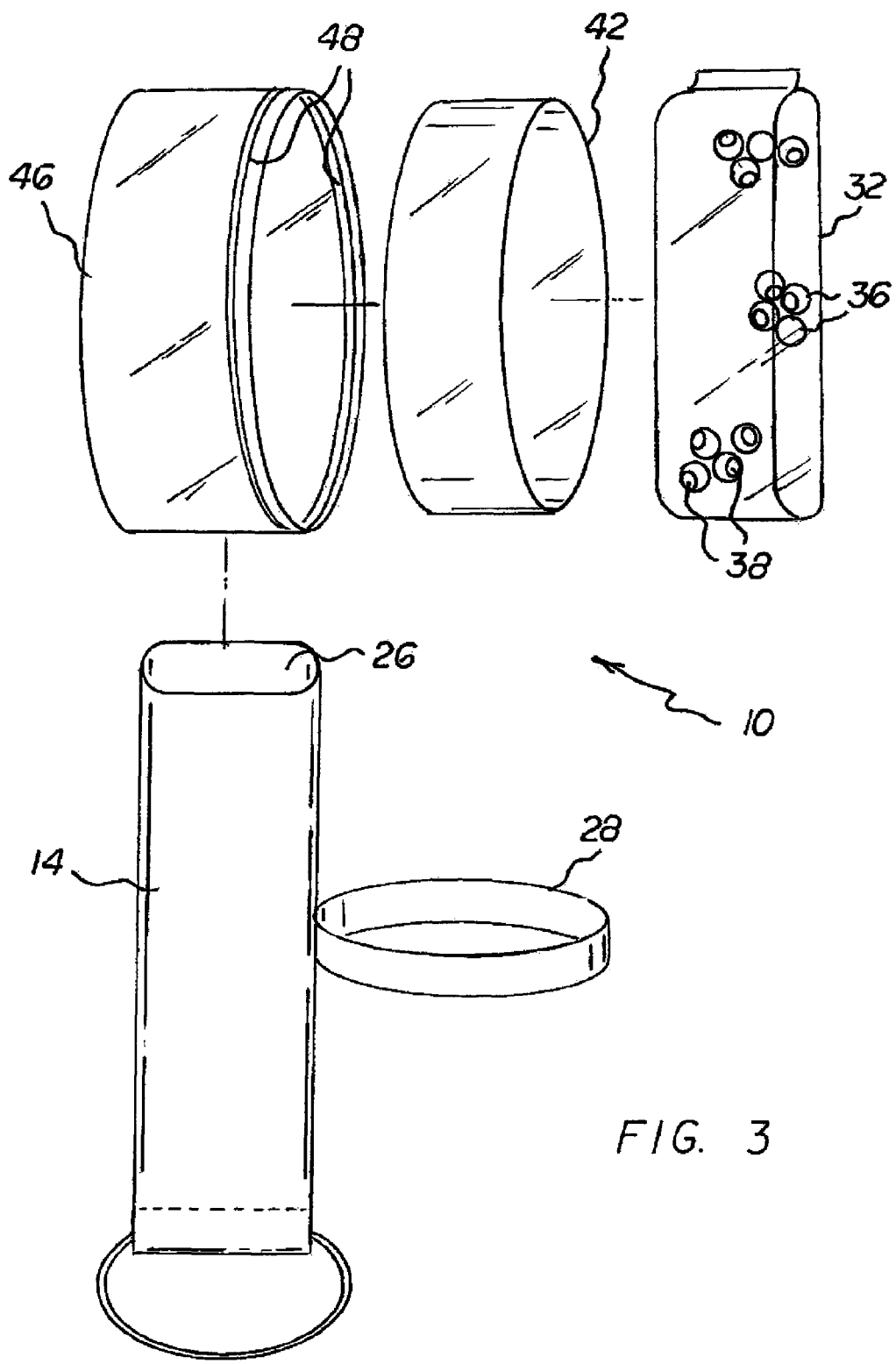
FIG. 3 is an exploded perspective view of the device shown in FIGS. 1 and 2.

With reference now to the drawings, and in particular to FIG. 1 thereof, the preferred embodiment of the new and improved game calling device embodying the principles and concepts of the present invention and generally designated by the reference numeral 10 will be described.

The present invention, the game calling device 10 is comprised of a plurality of components. Such components in their broadest context include a housing, a container and a plurality of objects. Such components are individually configured and correlated with respect to each other so as to attain the desired objective.

The game calling device 10 is for creating a sound at the discretion of a user. The sound is of the type to attract game. The creating of the sound and the attracting of the game are done in a safe, convenient and economical manner. First provided is a housing 14 fabricated in a cylindrical configuration of an inextensible woven fabric. The housing has a length of 6 inches, plus or minus 20 percent. The housing has a circumference of 2 inches, plus or minus 20 percent. The housing has a closed upper end. Grommets 16 extend through the closed upper end. A long cord 18 extends through the grommets for carrying purposes. The housing has a closed lower end with a fold forming a tunnel 20. A short cord 22 in a loop configuration extends through the tunnel for carrying purposes. The housing forms an enclosed chamber 26 between the upper and lower ends. An elastic band 28 in a cylindrical configuration is provided for carrying purposes. The elastic band is attached to the housing intermediate the upper and lower ends. The elastic band has a length of 0.5 inches, plus or minus 20 percent. The elastic band has a circumference of 8 inches, plus or minus 20 percent.

While the housing is preferably fabricated of a woven fabric, in an alternate embodiment of the invention, the housing is fabricated of a crinkle material chosen from the class of crinkle material chosen from the class of crinkle materials including cellophane, wax paper, nylon, polypropylene, polyethylene, and polyvinyl chloride. The container is adapted to produce a crackling and rustling sound when touched and manipulated by the user.

Next provided is a container 32. The container is positioned within the housing during use. The container has a length and a circumference to essentially fill the chamber of the housing. The container is fabricated of a crinkle material chosen from the class of crinkle material chosen from the class of crinkle materials including cellophane, wax paper, nylon, polypropylene, polyethylene, and polyvinyl chloride. The container is adapted to produce a crackling and rustling sound when touched and manipulated by the user.

Next provided within the container is plurality of spherical objects 36. Each spherical object of the plurality of spherical objects is fabricated of a rigid material and has an essentially spherical configuration. Each spherical object of the plurality of spherical objects has a diameter of 0.25 inches, plus or minus 20 percent. A diametric bore 38 extends through each spherical object for weight reduction and sound amplification purposes. The plurality of spherical objects is adapted to provide a three dimensional shape to the container and the housing for facilitating the movement of the crinkle material when manipulated by the user during use when attracting game.

A sleeve 42 in a cylindrical configuration is next provided. The sleeve receives the container during use. The sleeve has a circumference essentially equal to twice the length of the container. The sleeve has a length essentially equal to half the circumference of the container. The sleeve is fabricated of a crinkle material chosen from the class of crinkle materials including cellophane, wax paper, nylon, polypropylene, polyethylene, and polyvinyl chloride. The sleeve is adapted to produce a crackling and rustling sound when touched and manipulated by the user.

Lastly, a bag 46 is provided. This bag has a reusable slide closure 48. The bag receives the sleeve and the container during use. The bag has a depth essentially equal to the length of the sleeve. The bag has a circumference essentially equal to the circumference of the sleeve. The bag is fabricated of polyethylene with a thickness of from 2 mils to 4 mils. The bag is adapted to create a more secure retention of the spherical objects in the event of breakage of the container and sleeve.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game calling device for creating a sound at the discretion of a user, the sound being of the type to attract game, the creating of the sound and the attracting of the game being done in a safe, convenient and economical manner, the device including, in combination:

a housing fabricated in a cylindrical configuration of an inextensible woven fabric, the housing having a length of 6 inches, plus or minus 20 percent, with a circumference of 2 inches, plus or minus 20 percent, the housing having a closed upper end with grommets extending through the closed upper end, a long cord extending through the grommets for carrying purposes, the housing having a closed lower end with a fold forming a tunnel, a short cord in a loop configuration extending through the tunnel for carrying purposes, the housing forming an enclosed chamber between the upper and lower ends, an elastic band in a cylindrical configuration for carrying purposes, the elastic band being attached to the housing intermediate the upper and lower ends;

a container positioned within the housing during use, the container having a length and a circumference to essentially fill the chamber of the housing, the container being fabricated of a crinkle material chosen from the class of crinkle materials including cellophane, wax paper, nylon, polypropylene, polyethylene, and polyvinyl chloride, the container adapted to produce a crackling and rustling sound when touched and manipulated by the user;

a plurality of spherical objects within the container, each spherical object of the plurality of objects being fabricated of a rigid material and having an essentially spherical configuration, each spherical object of the plurality of spherical objects having a diameter of 0.25 inches, plus or minus 20 percent, a diametric bore extending through each spherical object for weight reduction purposes and sound amplification, the plurality of spherical objects adapted to provide a three dimensional shape to the container and the housing for facilitating the movement of the crinkle material when manipulated by the user when attracting game;

a sleeve in a cylindrical configuration, the sleeve receiving the container during use, the sleeve having a circumference essentially equal to twice the length of the container, the sleeve having a length essentially equal to half the circumference of the container, the sleeve being fabricated of a crinkle material chosen from the class of crinkle materials including cellophane, wax paper, nylon, polypropylene, polyethylene, and polyvinyl chloride, the sleeve adapted to Produce a crackling and rustling sound when touched and manipulated by the user; and a bag with a sealed closure, the bag receiving the sleeve and the container during use, the bag having a depth essentially equal to the length of the sleeve, the bag having a circumference essentially equal to the circumference of the sleeve, the bag being fabricated of polyethylene, the bag adapted to create a more secure retention of the spherical objects or spherical objects in the event of breakage of the container and sleeve.

\* \* \* \* \*